Jan. 30, 1951      K. P. GEORGE      2,539,575
INDICATING OR CONTROL DEVICE
Filed Jan. 10, 1948      2 Sheets-Sheet 1
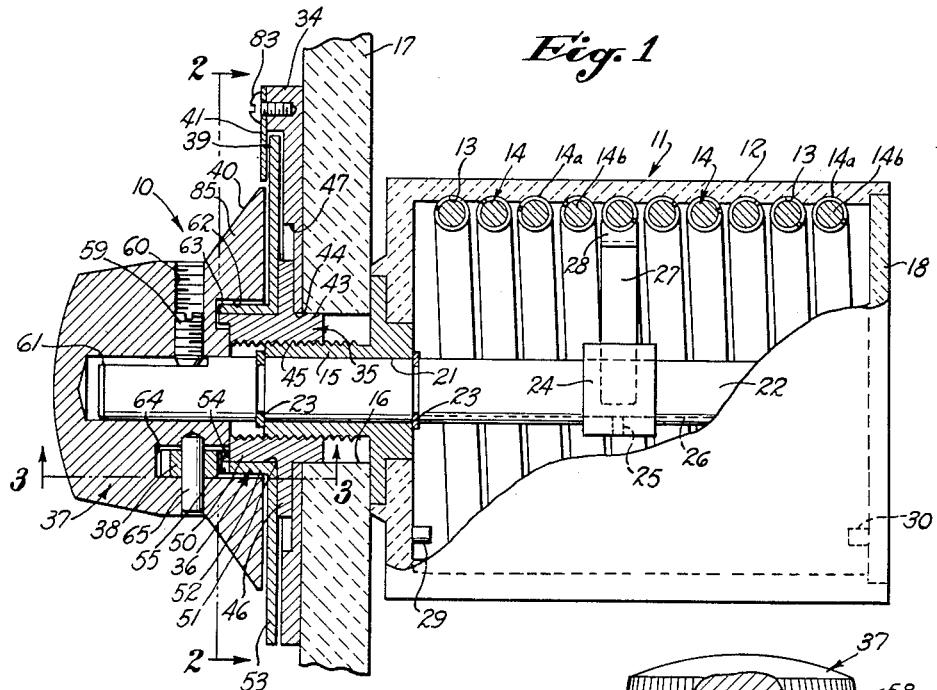
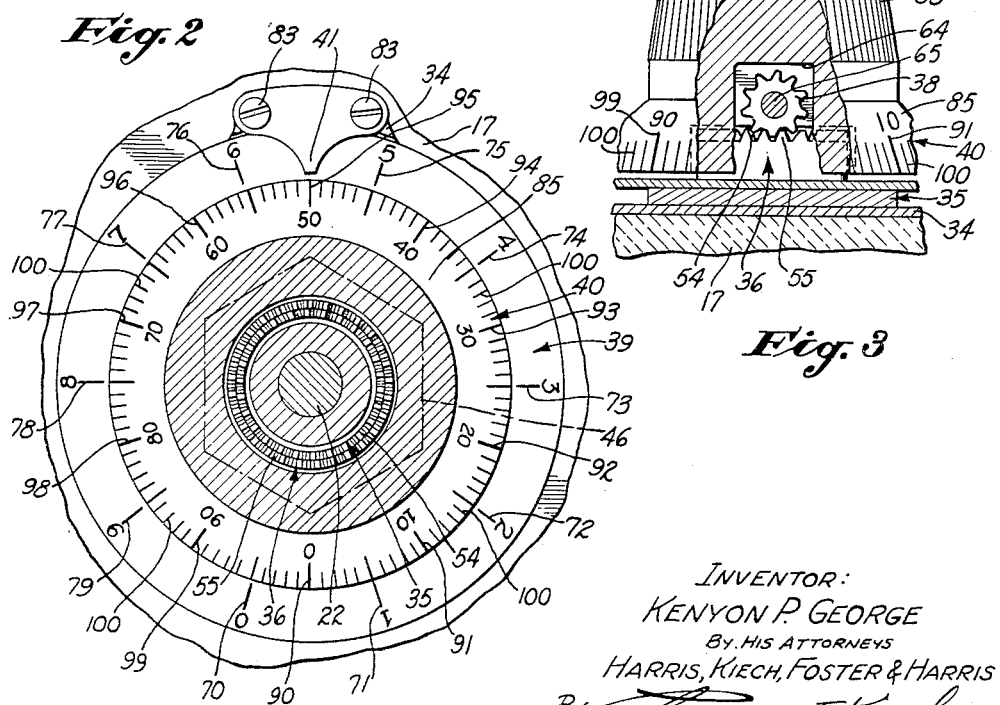
INVENTOR:
KENYON P. GEORGE
BY HIS ATTORNEYS
HARRIS, KIECH, FOSTER & HARRIS Jan. 30, 1951 K. P. GEORGE 2,539,575
INDICATING OR CONTROL DEVICE
Filed Jan. 10, 1948 2 Sheets-Sheet 2
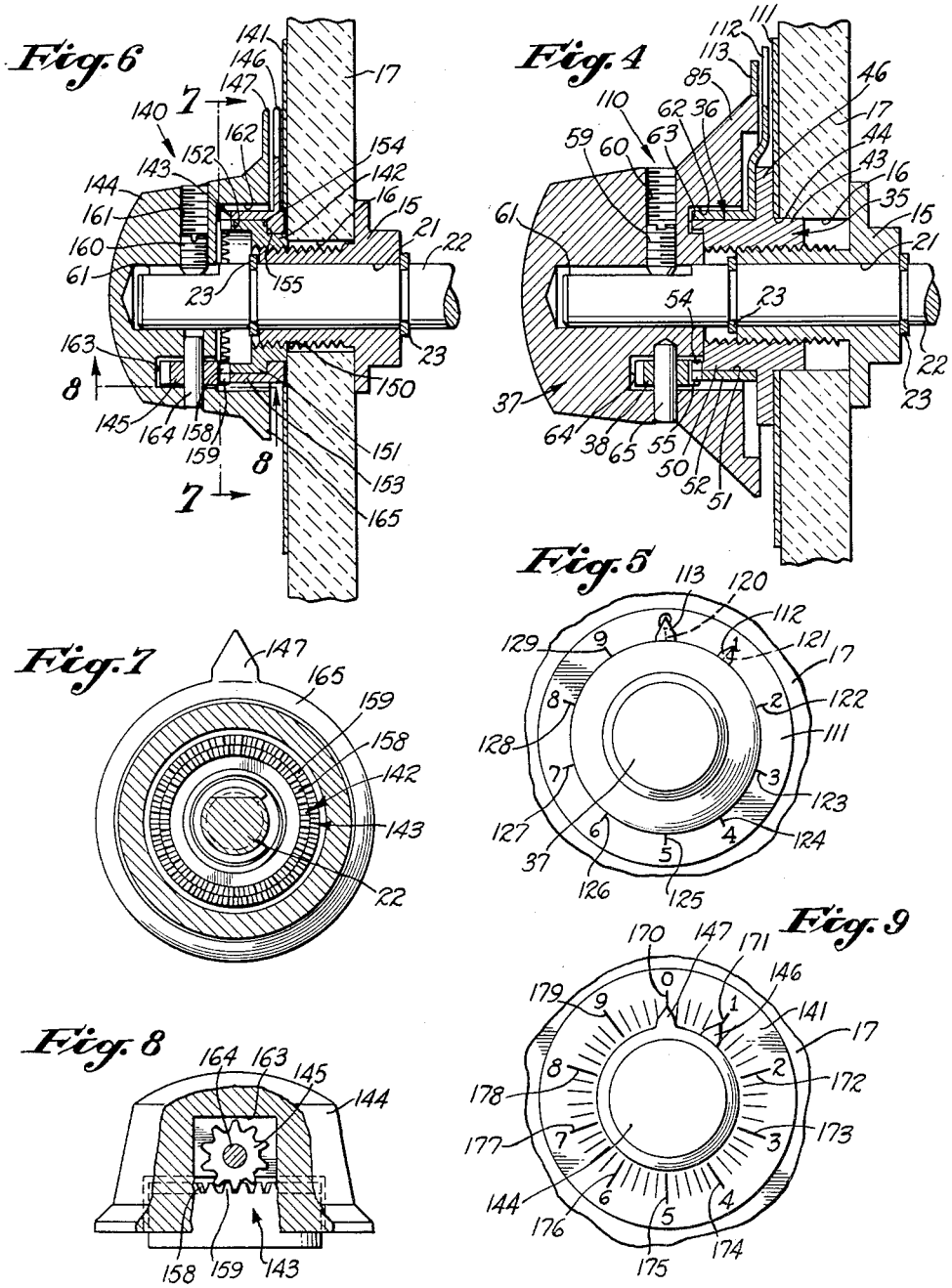
INVENTOR:
KENYON P. GEORGE
BY HIS ATTORNEYS
HARRIS, KIECH, FOSTER & HARRIS
By Clarence F. Kiech Patented Jan. 30, 1951

2,539,575

UNITED STATES PATENT OFFICE 2,539,575

INDICATING OR CONTROL DEVICE

Kenyon P. George, South Pasadena, Calif., assignor to Beckman Instruments, Inc., a corporation of California Application January 10, 1948, Serial No. 1,557

13 Claims. (Cl. 116—133)

My invention relates in general to position indicating or controlling devices and, more particularly, to a device for use in connection with a rotatable object to indicate and control the angular position of such an object, or the position of another object connected thereto. For example, my invention may take the form of a gear-containing knob which may be used in connection with a shaft to control the angular position of the shaft and to indicate its angular position, i. e., the number of revolutions and/or fraction of a revolution through which the shaft has been rotated, or which may be used to indicate or control the angular position of an object carried by the shaft, or the position of an object which drives or is driven by the shaft.

My invention finds particular utility when used in connection with such devices as variable resistors, inductors and capacitors, for example, and I prefer to consider herein an application of my invention to a variable resistor for convenience in effecting a disclosure thereof. However, as will be readily apparent to those skilled in the art, the invention is susceptible to various other applications and it will therefore be understood that I do not intend to be limited to the specific application disclosed herein for purposes of illustration.

An important object of the invention is to provide a device which is not only adapted to be used in connection with a shaft, such as the shaft of a variable resistor, for example, to indicate the angular position thereof, but which is also adapted to be used to rotate the shaft to control the angular position thereof. A related object is to provide such a device having both a manually operable control knob for varying the angular position of the shaft or other object with which it is associated and also an indicating means for showing accurately the angular position.

Another object of the invention is to provide a device of the foregoing character having two indicators, hereinafter termed the "revolution" and "fraction" indicators, which are adapted to show the number of complete revolutions and any fraction of a revolution respectively, through which the shaft has been rotated. A related object is to provide an indicating device wherein the two indicators are geared together.

An important object of the invention is to provide such an indicating device wherein the fraction indicator is adapted to be rigidly connected to the shaft of the apparatus with which the indicating device is to be used. Thus, the indicator which is used in making accurate readings or adjustments, i. e., the fraction indicator, is not subject to any gear backlash, which is an important feature of the invention.

A further object is to provide a device wherein the two indicators are connected by a differential gear system in such a manner that the fraction indicator, when rotated through one complete revolution, drives the revolution indicator through a fraction of a revolution.

Still another object is to provide an indicating device of the foregoing general character wherein the differential gear system includes concentric first and second gears having a third gear meshed therewith, the first and second gears having different numbers of teeth thereon and the first gear being stationary so that engagement of the teeth on the third gear with successive ones of the teeth on the first and second gears results in rotation of the second gear with respect to the first gear. An important object in this connection is to provide a device wherein the revolution indicator is connected to the second gear and wherein the third gear is carried by the fraction indicator.

Still another important object of my invention is to provide an indicating device in which a knob or other drive means carries the aforesaid third gear, also to provide such an arrangement in which the third gear is pivoted on an axis which is nonparallel to the axis of the first and second gears and which preferably extends generally outwardly relative to the axis of the first and second gears.

An additional object is to provide a stationary gear which is adapted to be threadedly connected to a suitable support and which is provided with means thereon for the reception of a tool for threadedly connecting it to the support.

A further object is to provide an indicating device of the character hereinbefore described wherein the two indicators may either be dials having circular scales thereon, or may be provided with pointers which are adapted to move over a stationary circular scale.

Additional objects of my invention include the provision of a device which is extremely compact and of simple construction, and which may be either manually operated or power operated.

The foregoing objects of my invention and the advantages suggested thereby, together with various other objects and advantages which will be evident hereinafter, may be attained through the utilization of the exemplary embodiments of the invention which are illustrated in the accompanying drawings and which are described in detail hereinafter. Referring to the drawings:

Fig. 1 is a sectional view illustrating an indicating and controlling device which represents the presently preferred embodiment of my invention as used in connection with a variable resistor;

Figs. 2 and 3 are sectional views which are taken along the broken lines 2—2 and 3—3, respectively, of Fig. 1;

Fig. 4 is a sectional view illustrating another embodiment of the invention;

Fig. 5 is a front elevational view of the device illustrated in Fig. 4;

Fig. 6 is a sectional view illustrating a third embodiment of my invention;

Figs. 7 and 8 are sectional views which are taken along the broken lines 7—7 and 8—8, respectively, of Fig. 6; and Fig. 9 is a front elevational view of the device illustrated in Fig. 6.

Referring particularly to Fig. 1 of the drawings, I show one embodiment of my indicating and controlling device, indicated generally by the numeral 10, used in connection with a variable resistor 11 which, per se, forms no part of the present invention. The resistor 11 is diagrammatically shown as including a cylindrical housing 12 which is provided with a shallow, helical groove 13 therein to receive the major turns of a helical, wound resistance element 14, the resistance element being shown as having ten complete major turns, although any desired number of such turns may be employed. Each major turn comprises a large number of minor turns 14a wound helically around a core 14b. Molded or otherwise secured to one end of the housing 12 is an externally threaded fitting 15 which is adapted to project through an opening 16 in a panel 17, the opposite end of the housing being closed by a cover 18. Journalled in a bore 21 in the fitting 15 is a shaft 22 having annular grooves therein for split rings 23, or the like, the latter being adapted to seat against the ends of the fitting to prevent axial movement of the shaft.

The shaft 22 carries a collar 24 which is slidable longitudinally of the shaft, but which is prevented from rotating relative to the shaft by a pin 25 extending into a longitudinal groove 26 in the shaft. The collar 24 is provided with an arm 27 having thereon a grooved contact 28 which partially encircles the resistance element 14, this contact being adapted to slide along the helical resistance element as the shaft 22 is rotated so as to move the collar 24 longitudinally of the shaft. It will be apparent that as the shaft 22 is rotated in the clockwise direction, as viewed in Fig. 2 of the drawings, the contact 28 will follow the turns of the resistance element 14 to move the collar 24 axially from right to left, as viewed in Fig. 1. Conversely, by rotating the shaft 22 in the counterclockwise direction, as viewed in Fig. 2, the collar 24 may be moved from left to right, as viewed in Fig. 1. Such axial movement of the collar 24 is limited by stops 29 and 30 which are mounted on the inner surfaces of the end walls of the cylindrical housing 12 in the path of the arm 27 in positions such that they limit movement of the sliding contact 28 beyond the corresponding ends of the helical resistance element 14.

The variable resistor 11 may be incorporated in an electrical circuit whose resistance is to be varied by means of suitable connections (not shown) to the sliding contact 28 and one end of the helical resistance element 14, e. g., the right end of the resistance element as viewed in Fig. 1. Alternatively, the resistor 11 may be connected as a potentiometer. Thus, the resistance provided by the variable resistor 11 depends upon the position of the sliding contact 28, the resistance from one end being a minimum when the sliding contact is in one extreme position and being a maximum when it is in the other extreme position. It will be apparent that in order to determine the resistance offered by the variable resistor 11, it is necessary to determine the position of the sliding contact 28 on the resistance element 14. This may be accomplished by determining the number of revolutions and/or fraction of a revolution through which the shaft 22 has been rotated, which is the function of the indicating device 10 in the particular application illustrated.

As best shown in Fig. 1 of the drawings, the device 10 includes five main components, viz., an indexing plate 34 which is adapted to seat against the front face of the panel 17, a first, stationary gear or gear member 35 which is adapted to be threadedly connected to the fitting 15, a second gear or gear member 36 which is carried by and is rotatable relative to the stationary gear member, an actuating member 37 (exemplified as a knob) which is adapted to be rigidly connected to the shaft 22 so as to be rotatable therewith relative to the gear members 35 and 36, and a third, idling gear 38 which is carried by the actuating member and which is meshed with the gear members 35 and 36, the latter having different numbers of teeth thereon so that the idling gear 38 causes the gear member 36 to rotate relative to the stationary gear member 35 upon rotation of the actuating member as will be discussed in more detail hereinafter. The device 10 also includes first and second indicating means or indicators 39 and 40 which are exemplified as carried by the gear member 36 and the actuating member 37, respectively, and which are adapted to cooperate with a pointer 41 on the indexing plate 34 to indicate the number of revolutions and/or fraction of a revolution through which the sliding contact 28 has been rotated from a given or end position, the indicators being dials having circular scales thereon in the particular embodiment illustrated in Figs. 1 to 3.

Considering the indicating and controlling device 10 in more detail, the stationary gear member 35 is provided with a boss 43 which projects through a central opening 44 in the indexing plate 34 into the opening 16 in the panel 17, and is provided with a threaded bore 45 which is adapted to receive the externally threaded fitting 15, the stationary gear member also having a flange 46 thereon which is disposed in a central recess 47 in the indexing plate when the indicating device is assembled. It will be noted that when the stationary gear member 35 is tightly threaded on the fitting 15, the flange 46 thereon bears against the indexing plate 34 to clamp it to the panel 17 so that it is unnecessary to provide additional means for securing the indexing plate to the panel. It will also be apparent that the stationary gear member 35 and the fitting 15 cooperate to clamp the variable resistor 11 to the panel 17, as well as to clamp the indexing plate 34 thereto. In order to facilitate tightening of the stationary gear member 35 on the fitting 15, the flange 46 is formed to receive a suitable tool, this preferably being accomplished by making the flange hexagonal, as best shown in Fig. 2, to permit application of a wrench thereto.

The stationary gear member 35 is provided with a cylindrical portion 50 which extends into a bore 51 in a sleeve portion 52 of the gear member 36, the latter being carried by and being adapted to rotate about the cylindrical portion 50 of the stationary gear member. The gear member 36 is provided with a radial flange which, as will be discussed in more detail hereinafter, forms the indicator or dial 39 and which is journalled against the flange 46 on the stationary gear member 35 to prevent axial movement of the gear member 36 toward the right, as viewed in Fig. 1 of the drawings.

Formed on the forward end of the cylindrical portion 50 of the stationary gear member 35 are axially extending gear teeth 54, similar gear teeth 55 being formed on the forward end of the sleeve portion 52 of the second gear member 36 and being disposed in the same radial plane as the teeth 54. Thus, the stationary gear member 35 and the rotatable gear member 36 are, in effect, crown gears both of which are meshed with the idling gear 38 carried by the actuating member 37.

As previously indicated, the teeth 54 on the stationary gear member 35 differ in number from the teeth 55 on the gear member 36 so that the idling gear 38 will rotate the gear 36 upon rotation of the actuating member 37, the difference in the numbers of teeth depending upon the particular apparatus with which the device 10 is employed, e. g., the variable resistor 11, and depending upon the nature of the dial 39 carried by the gear member 36. Since, as previously discussed, the helical resistance element 14 of the particular variable resistor 11 shown comprises ten complete turns, the device 10 is preferably so designed that the gear member 36 and the dial 39 carried thereby rotate one-tenth of a revolution for each complete revolution of the actuating member 37 when the indicating device is used with the particular variable resistor 11. In other words, as the actuating member 37 and shaft 22 are rotated through 360° so as to move the sliding contact 28 along one full turn of the resistance element 14, the gear member 36 and dial 39 are preferably rotated through one-tenth of a revolution. Thus, when the sliding contact 28 is moved from one end of the helical resistance element 14 to the other by rotating the shaft 22 through ten complete revolutions, by means of the actuating member 37 the gear member 36 and dial 39 are rotated through one complete revolution.

The foregoing may be accomplished by providing the gear member 36 with ten teeth 55 for every nine teeth 54 on the stationary gear member 35 if rotation of the gear member 36 and dial 39 in the same direction as the actuating member 37 is desired. If counter-rotation of the gear member 36 and actuating gear member 37 is desired, this may be accomplished by providing the stationary gear member 35 with eleven teeth and the gear member 36 with ten teeth. In the particular construction illustrated in the drawings, the stationary gear member 35 is provided with twenty-seven teeth 54 and the gear member 36 is provided with thirty teeth 55. However, I do not desire to be limited to any specific numbers of teeth for the gear members 35 and 36 since the numbers of teeth may be varied as hereinbefore discussed as long as the proper ratio is maintained, although it is advantageous to use relatively large numbers of teeth on the gear members 35 and 36 since this permits the use of a smaller idling gear 38. It is distinctly preferable to dispose the larger number of teeth on the outer gear member 36. The arrangement of the invention is such that the circular pitch on each gear member can be equal so that a single idling gear meshing therewith can be used, thus eliminating backlash and insuring extreme accuracy of the indications.

It will be apparent that since the teeth 54 and 55 on the gear members 35 and 36 differ in number, the gear member 36 will be rotated by the idling gear 38 as the teeth on the latter mesh with successive ones of the teeth on the gear members 35 and 36 upon rotation of the actuating member 37. Thus, with the ten to nine ratio hereinbefore discussed, the gear member 36 will be rotated through an angle corresponding to the spacing of the teeth 55 thereon, i. e., one-tenth of a complete revolution, for each complete revolution of the actuating member 37.

In the particular construction illustrated in Figs. 1 to 3 of the drawings, the actuating member 37 is a knob which is preferably knurled, as indicated at 58, for convenience in manipulation, and which is adapted to be rigidly connected to the shaft 22 by a set screw 59 threaded into a bore 60 in the knob, the shaft being provided with a flat 61 against which the set screw is adapted to bear. The knob 37 is provided with a recess 62 therein which receives the sleeve portion 52 of the gear member 36 and is provided with an annular groove 63 in the base of this recess into which the teeth 54 and 55 on the gear members 35 and 36 extend, the idling gear 38 being disposed in a cavity 64 in the knob which communicates with the groove 63 and being rotatively mounted on a pin 65 which extends through this cavity, as best shown in Figs. 1 and 3.

One of the important concepts of the invention is to associate the idling gear 38 with the knob or actuating member 37. Another important concept is the mounting of the idling gear 38 to revolve about the common axis of the gear members 35 and 36 while rotating about the axis of the pin 65. In these connections, the invention comprehends an indicating device in which the axis of rotation of the idling gear 38 shall be non-parallel to the common axis of the gear members 35 and 36. In Figs. 1 to 3 the journalling pin 65 is shown as radially disposed but it should be understood that any outwardly-extending pin position can be used by which term I have reference not only to the radial position shown but also to other non-radial positions in which the pin axis is in the plane of the paper as viewed in Fig. 1 and to other non-radial positions in which the pin axis is tangential to a circle drawn about the common axis of the gear members 35 and 36. The concepts mentioned in this paragraph are of particular importance if compactness is desired and result in the possibility of manufacturing an indicating and control device of much smaller size and greater simplicity than heretofore available.

As best shown in Fig. 2 of the drawings, the dial 39 carried by the gear member 36 is formed on the flange 53 thereof and is divided into ten equal parts, the divisions being indicated by indicia 70, 71, 72, 73, etc., which are identified by the numerals "0," "1," "2," "3," etc. The dial 39 may be read with reference to any suitable reference, e. g., the pointer 41 which is carried by the indexing plate 34, the pointer being secured to the indexing plate by screws 83 or the like.

The dial 40 carried by the knob 37 is preferably formed on a skirt 85 of the knob and is concentric with but of smaller diameter than the dial 39 so that it may also be read with reference to the pointer 41. As best shown in Fig. 2 of the drawings, the dial 40 is divided into ten equal major parts, the major divisions being indicated by indicia 90, 91, 92, 93, etc., having the numerals "0," "10," "20," "30," etc., thereadjacent. In addition, each major division of the dial 40 is divided into ten equal minor parts, each minor division being indicated by an indicium 100. Thus, the indicia 90, 91, 92, etc., on the dial 40 represent tenths of a revolution of this dial and the indicia 100 thereon represent hundredths of a revolution.

Considering the operation of the device 10, as the knob 37 is rotated to drive the shaft 22 and thus move the sliding contact 28 along the helical resistance element 14, the dial 39 carried by the gear member 36 will be driven at one-tenth the speed of the dial 40 through the cooperation of the gear members 35 and 36 and the idling gear 38 in the manner previously discussed. In other words, as the knob 37 and its dial 40 are rotated through one complete revolution to move the sliding contact 28 around one full turn of the helical resistance element 14, the gear member 36 and its dial 39 will be rotated through one-tenth of a revolution, it being understood that this 10:1 speed ratio will be obtained only when the specific tooth ratio discussed previously herein is employed and that other speed ratios may be obtained by using other tooth ratios. Thus, it will be apparent that the numerals on the dial 39 will indicate the number of complete revolutions through which the sliding contact 28 has been moved and that the numerals on the dial 40 will indicate any fraction of a revolution through which it has been rotated, the fraction of a revolution being expressed decimally. For example, with the sliding contact 28 in approximately the position shown in Fig. 1 of the drawings, the device 10 shows, referring to Fig. 2, that the sliding contact has been moved through 5.50 revolutions from the right end of the helical resistance element 14, as viewed in Fig. 1.

It will be understood that although I have shown the dials 39 and 40 as being calibrated in terms of revolutions and fractions of revolutions, these dials may be calibrated in any suitable units. For example, when the indicating and controlling device 10 is used with the variable resistor 11, the dials 39 and 40 may be calibrated in ohms if desired.

One feature of the present invention resides in the ease with which the device 10 and variable resistor 11 may be assembled and mounted on the panel 17. As previously pointed out, in order to mount the variable resistor 11 and the indexing plate 34 of the indicating device 10 on the panel, it is merely necessary to thread the stationary gear member 35 on the fitting 15 and to tighten it by applying a wrench or other suitable tool to the hexagonal periphery of the flange 46 thereon. Subsequently, the gear member 36 may be telescoped over the cylindrical portion 50 of the stationary gear member 35, it being necessary to install the pointer 41 after the gear member 36 has been positioned. The assembly of the indicating device 10 may then be completed by slipping the knob 37 over the forward end of the shaft 22 and securing it thereto by means of the set screw 59. Thus, all moving parts of the indicating device 10 may be installed after the stationary gear member 35 has been threaded on the fitting 15 and tightened, which is an important feature of the invention. However, it will be understood that I do not intend to be limited to the specific installation shown in Fig. 1 of the drawings since the indicating device 10 may be mounted in a similar manner when used with devices other than the variable resistor 11, and may also be mounted in various other manners.

In Figs. 4 and 5 of the drawings, I show an indicating and controlling device 110 which is similar to the previously described device 10, the principal difference between the devices 10 and 110 being that the latter is provided with an indexing plate 111 and indicators 112 and 113 which correspond to but differ in construction from the indexing plate 34 and indicators 39 and 40 of the device 10. With the foregoing exceptions, the indicating and controlling devices 10 and 110 are substantially identical and the remaining components of the latter are identified by the same numerals which were used to identify corresponding components of the device 10.

As best shown in Fig. 5 of the drawings, the indexing plate 111, instead of being provided with a pointer such as the pointer 41 on the indexing plate 34, is provided with a dial having indicia 120, 121, 122, 123, etc., thereon which are numbered "0," "1," "2," "3," etc respectively. The indicators 112 and 113, instead of being dials as in the indicating device 10, are pointers which are carried by the gear member 36 and the knob 37, respectively, and which are movable over the dial on the indexing plate 111. Thus, the pointer 112 indicates the number of complete revolutions through which the knob 37 has been rotated and the pointer 113 indicates any fraction of a revolution through which it has been rotated, the operation of the device 110 otherwise being identical to that of the device 10.

In Figs. 6 to 9 of the drawings, I show an indicating and controlling device 140 which, basically, is substantially identical to the device 110, the only differences being in the structural details. Referring particularly to Fig. 6 of the drawings, the device 140 also includes five main components, viz., an indexing plate 141 which is adapted to seat against the front face of the panel 17 and which is provided with a dial thereon, a stationary gear or gear member 142 which is adapted to be threadedly connected to the fitting 15, a second gear or gear member 143 which is carried by and is rotatable relative to the stationary gear member, an actuating member 144 (exemplified as a knob) which is adapted to be rigidly connected to the shaft 22 so as to be rotatable therewith relative to the gear members 142 and 143, and an idling gear 145 which is carried by the knob 144 and which is meshed with the gear members 142 and 143, the latter having different numbers of teeth thereon so that the idling gear causes the gear member 143 to rotate relative to the stationary gear member 142 upon rotation of the knob, all as hereinbefore described. The device 140 also includes first and second indicators 146 and 147 (exemplified as pointers) which are carried by the gear member 143 and the knob 144, respectively, and which are adapted to move around the dial on the indexing plate 141 to indicate the number of revolutions and/or fraction of a revolution through which the knob 144 and shaft 22 have been rotated.

Considering the indicating and controlling device 140 in more detail, the stationary gear member 142 is provided with a threaded bore 150 which is adapted to receive the externally threaded fitting 15, and is adapted to seat against the front face of the panel 17 when tightly threaded on the fitting 15. In the embodiment shown in Figs. 6 to 9 of the drawings, the indexing plate or dial 141 is not clamped to the front face of the panel 17 by the stationary gear member 142, as is the case with the indexing plate 34 of the indicating device 10, but is adapted to be mounted on the front face of the panel 17 by any suitable means (not shown) such as screws, or the like. The stationary gear member 142 is provided with a cylindrical portion 151 which is disposed in a bore 152 in a sleeve portion 153 of the gear member 143, the latter being carried by and being adapted to rotate about the cylindrical portion 151 of the stationary gear member. The gear member 143 is provided with a shoulder 154 which is adapted to engage a complementary shoulder 155 on the stationary gear member 142 to retain the gear member 143 on the stationary gear member. It will be apparent that with this construction, the gear member 143 must be mounted on the stationary gear member 142 before the latter is threaded on the fitting 15, whereas in the devices 10 and 110, the gear member 36 may be mounted on the stationary gear member 35 after the latter has been threaded on the fitting 15, which is an advantage of the devices 10 and 110 over the device 140.

Formed on the forward end of the cylindrical portion 151 of the stationary gear member 142 are axially extending gear teeth 158, similar gear teeth 159 being formed on the forward end of the sleeve portion 153 of the rotatable gear member 143 and in substantially the same radial plane as the teeth 158. As is the case with the teeth 54 and 55 on the gear members 35 and 36, the teeth 158 on the stationary gear member 142 differ in number from the teeth 159 on the rotatable gear member 143 so that the idling gear 145 will rotate the gear member 143 in a manner similar to that described previously upon rotation of the knob 144. As hereinbefore discussed, the difference in the numbers of teeth on the gear members 142 and 143 depends upon the particular apparatus with which the indicating and controlling device 140 is to be used and may be varied as required to provide any desired ratio between the rotational speeds of the gear member 143 and the knob 144.

The knob 144 of the device 140 is substantially identical to the knob 37 of the devices 10 and 110, the knob 144 being adapted to be rigidly connected to the shaft 22 by a set screw 160 threaded into a bore 161 in the knob and being adapted to bear against the flat 61 on the shaft. The knob 144 is provided with a recess 162 therein which receives the sleeve portion 153 of the rotatable gear member 143 and is provided with a cavity 163 therein which communicates with this recess and receives the idling gear 145, the latter being rotatably mounted on an outwardly extending pin 164 which extends through this cavity, as best shown in Figs. 6 and 8, and being meshed with the gear members 142 and 143.

As best shown in Fig. 6 of the drawings, the pointer 146 carried by the rotatable gear member 143 extends radially from the sleeve portion 153 thereof and is adapted to move over the dial on the indexing plate 141. The pointer 147 carried by the knob 144 extends radially from a skirt 165 of the knob and is spaced forwardly from the pointer 146 on the gear member 143, the pointer 147 also being movable over the dial on the indexing plate 141. The dial on the indexing plate is similar to the dial on the indexing plate 111 of the indicating and controlling device 110 and, in the particular construction illustrated, is also divided into ten equal parts, these divisions being indicated by indicia 170, 171, 172, 173, etc., having the numerals "0," "1," "2," "3," etc., thereadjacent, respectively.

The operation of the indicating and controlling device 140 is identical to that of the device 110, the pointer 146 carried by the rotatable gear member 143 indicating the number of complete revolutions of the knob 144 and the pointer 147 carried by the knob indicating fractions of revolutions. As previously discussed, although the scales on the various devices disclosed herein are shown as calibrated in terms of revolutions and fractions of revolutions, they may be calibrated in any desired units without departing from the spirit of the invention.

Although I have illustrated the indicating and controlling devices 10, 110 and 140 as being provided with manually operable knobs for rotating the shaft 22, it will be understood that the shaft may be driven in various other ways and may be power driven if desired. It will be apparent that the shaft 22 may also be driven from any point thereon and that it may be driven in either direction since the differential gear systems of the indicating devices are reversible. Further, it will be noted that since the indicators for indicating fractions of revolutions, viz., the indicator 40 of the device 10, the indicator 113 of the device 110, and the indicator 147 of the device 140, are adapted to be rigidly connected to the shaft 22 or other rotatable object with which the devices are to be used, the indicators which are used in making accurate readings or adjustments are not subject to any lost motion which may arise through wear of the differential gear systems.

Although I have disclosed an exemplary application and various exemplary embodiments of my invention herein for purposes of illustration, it will be understood that the invention is susceptible to various other applications and that various changes, modifications and substitutions may be incorporated in the specific embodiments disclosed without necessarily departing from the spirit of the invention. Consequently, I hereby reserve the right to the protection afforded by the full scope of the appended claims.

I claim as my invention:

1. In a device of the character described for use with a rotatable object, the combination of: a first member provided with first indicating means; means for rigidly connecting said first member to the object so as to be rotatable therewith; a stationary gear having an axis coinciding with the axis of rotation of the object; a second member rotatable about said axis relative to said first member and said stationary gear, said second member including a gear having teeth thereon differing in number from the teeth on said stationary gear, and said second member being provided with second indicating means; a third gear carried by said first member and meshed with said stationary gear and said gear on said second member; and stationary indicating means adjacent and cooperating with said first and second indicating means.

2. A device as set forth in claim 1 wherein said first and second indicating means include concentric dials.

3. An indicating device as set forth in claim 1 wherein said first and second indicating means comprise pointers.

4. A device as set forth in claim 1 wherein said first member comprises a knob.

5. In a device for indicating the position of an object which is adapted to be driven by a rotatable shaft, the combination of: a first indicating member providing an axis; means for rigidly connecting said first indicating member to the shaft with its axis coinciding with the axis of rotation of the shaft so as to render said first indicating member rotatable with the shaft; a stationary gear disposed symmetrically about the axis of said first indicating member; a second indicating member rotatable about the axis of said first indicating member relative to said first indicating member and said stationary gear, said second indicating member including a gear which is concentric with said stationary gear and which is provided with teeth thereon differing in number from the teeth on said stationary gear; and a third gear carried by and spaced from the axis of said first indicating member and meshed with said stationary gear and said gear on said second indicating member.

6. In a device of the character described, the combination of: concentric first and second gears having different numbers of teeth thereon, said first gear being stationary and being provided with a cylindrical portion, said second gear having a sleeve portion in which said cylindrical portion of said first gear is disposed, said second gear being carried by and being rotatable about said cylindrical portion of said first gear, said teeth on said first gear being formed on one end of said cylindrical portion thereof and said teeth on said second gear being formed on one end of said sleeve portion thereof, said ends being disposed in substantially the same plane; a third gear meshed with said first and second gears; and means for moving said third gear along a circular path relative to said first and second gears so as to rotate said second gear about said cylindrical portion of said first gear.

7. In a device of the character described, the combination of: concentric first and second gears having a common axis and having different numbers of teeth thereon, said first gear being stationary and being provided with a cylindrical portion, said second gear having a complementary bore in which said first gear is disposed, said second gear being carried by and being rotatable about said cylindrical portion of said first gear, and said second gear being provided with indicating means thereon; an actuating member rotatable relative to said first and second gears about said common axis and provided with indicating means thereon; and a third gear carried by said actuating member and meshed with said first and second gears to be rotated by said first gear in a manner to rotate said second gear upon rotation of said actuating member.

8. A device as set forth in claim 7 wherein said actuating member comprises a knob.

9. In a device of the character described, the combination of: a stationary gear provided with a threaded portion so as to be threadedly connectible to a support and having means thereon for the reception of a tool for threadedly connecting it to the support; a second gear concentric with and rotatable relative to said stationary gear, the teeth on said stationary gear and on said second gear differing in number; an actuating member rotatable relative to said stationary gear and said second gear; and a third gear carried by said actuating member and meshed with said stationary gear and said second gear so as to rotate said second gear upon rotation of said actuating member.

10. In a device of the character described for turning a shaft, the combination of: a stationary gear; a rotatable gear having indicating means thereon and having a number of teeth differing from the number of teeth on said stationary gear; means for mounting said stationary and rotatable gears with their axes common and in alignment with the axis of said shaft; an actuating member having indicating means thereon and adapted to be connected to said shaft to rotate about said shaft axis and the common axis of said stationary and rotatable gears; an idling gear; and means carried by said actuating member in its rotation for journalling said idling gear to revolve about said shaft axis in a circular orbit near said stationary and rotatable gears while meshed therewith and to rotate about an axis non-parallel to said shaft axis.

11. In a device of the character described for turning a shaft, the combination of: a stationary gear member comprising a cylindrical portion having a toothed end comprising a stationary gear; a rotatable gear member comprising a tubular portion having a toothed end comprising a rotatable gear, said stationary and rotatable gears being concentric and being coaxial with respect to each other and to said shaft axis, the number of teeth on said stationary gear differing from the number of teeth on said rotatable gear; an actuating member rotatable about said shaft axis and disposed immediately forward of said stationary and rotatable gears; a pin carried by said actuating member and providing a portion spaced from said shaft axis, said pin having an axis forward of and traversing the teeth of both the stationary and movable gears; and an idling gear journalled on said portion of said pin and having teeth simultaneously meshing with the teeth of said stationary and rotatable gears.

12. In a device of the character described for turning a shaft, the combination of: an outer gear adapted to be mounted coaxially with the shaft and having a plurality of teeth all facing substantially in the same direction; an inner gear coaxial with said outer gear and providing teeth all facing in the same general direction as the teeth of said outer gear, said outer gear having a different number of teeth than said inner gear; means for holding one of said gears stationary and for rotatably mounting the other of said gears to turn about the common axis of said gears; an actuating member rotatable about said common axis and substantially enclosing said gears; means for detachably connecting said actuating member to the shaft; an idling gear; and means carried by said actuating member in its rotation for journalling said idling gear to revolve about said shaft axis and to rotate about an axis non-parallel to said shaft axis, the axis of rotation of said idling gear being spaced from and extending across the teeth of both the inner and outer gears, said idling gear having teeth simultaneously meshing with the teeth of said inner and outer gears.

13. A device as set forth in claim 9 including a support threadedly connected to said stationary gear, said support having a surface which is adapted to engage one side of a wall means and said stationary gear having a surface which is adapted to engage the opposite side of the wall means so as to clamp the wall means between said surfaces when said support and said stationary gear are threadedly connected.

KENYON P. GEORGE.

REFERENCES CITED

The following references are of record in the file of this patent:

UNITED STATES PATENTS

| Number | Name | Date |
| --- | --- | --- |
| 1,027,549 | Kronert | May 28, 1912 |
| 1,534,356 | Burke | Apr. 21, 1925 |
| 1,737,741 | Thomas | Dec. 3, 1929 |
| 2,055,488 | Green et al. | Sept. 29, 1936 |
| 2,273,956 | Hall | Feb. 24, 1942 |
| 2,313,183 | Trbojevich | Mar. 9, 1943 |

FOREIGN PATENTS

| Number | Country | Date |
| --- | --- | --- |
| 615,612 | France | Oct. 16, 1926 |